Figure 1:
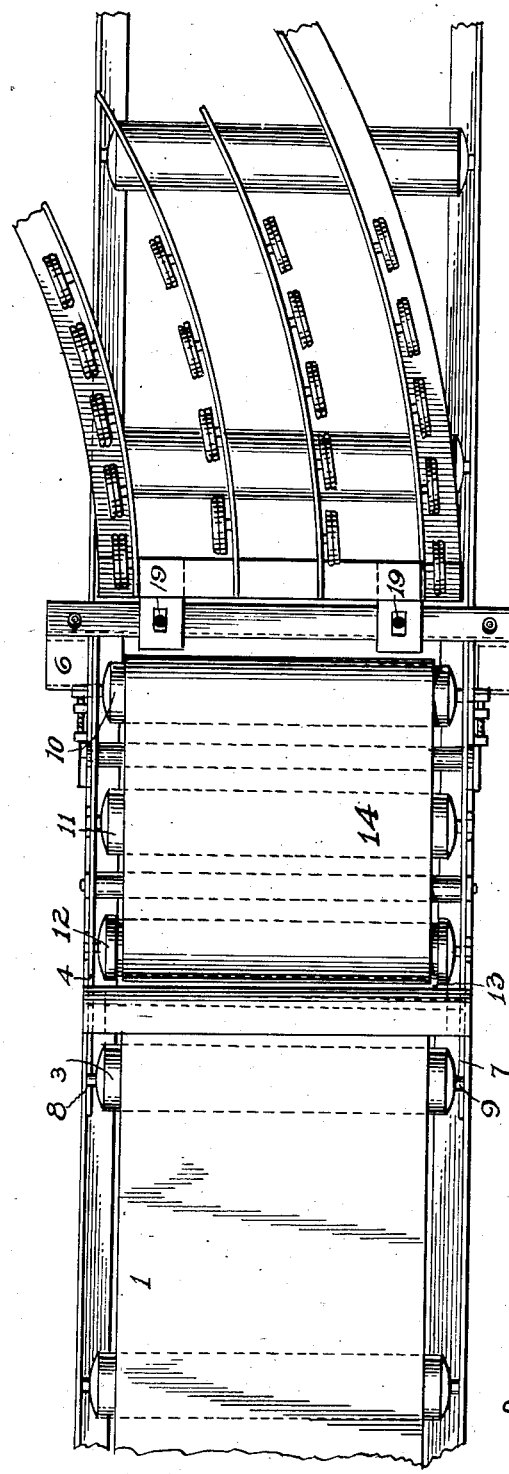

May 21, 1935.  P. VAN WYK ET AL  2,001,927
PACKAGE DIVERTING DEVICE
Filed April 13, 1933   2 Sheets-Sheet 1

Inventors
Paul Van Wyk.
Irvine R. Acheson
By
Graham
Attorney

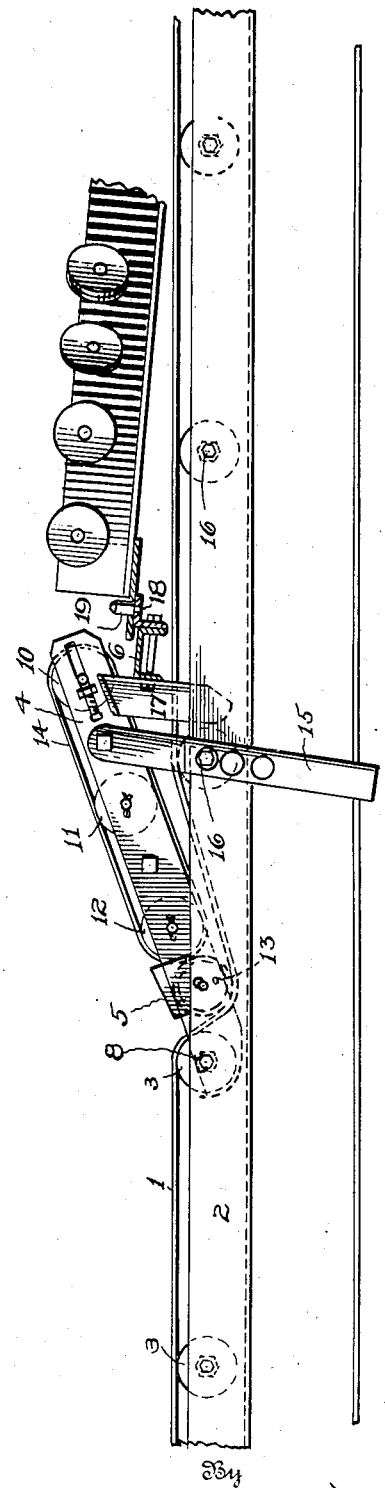

Patented May 21, 1935

2,001,927

UNITED STATES PATENT OFFICE 2,001,927

PACKAGE DIVERTING DEVICE

Paul Van Wyk and Irvine R. Acheson, Portland, Oreg., assignors to Food Machinery Corporation, San Jose, Calif., a corporation of Delaware Application April 13, 1933, Serial No. 666,036

13 Claims. (Cl. 198—185)

This invention relates to an apparatus for use with transfer systems in storage warehouses or for conveying various articles from place to place and comprises a portable unit that is attachable at will, to any desired place along a conveyor system to change the direction of movement of articles or to convey them to remote locations.

Long conveyor belts are usually employed in storage warehouses, in connection with the well known gravity roller conveyors for transferring and distributing packages of various sorts throughout the warehouse or for conveying them to loading platforms or cars.

These belt conveyors are usually extended the full length of the storage house and at intervals the packages are diverted from the main conveyor by means of various devices but principally by a simple sweep arm overlying the belt at the place of diversion for intercepting the packages and turning them from the straight belt to a positioned gravity conveyor or to another conveyor of some sort for conveyance in another direction.

All devices heretofore for the diversion of articles from a main source of conveyance have given more or less trouble from the friction involved where the packages are at all heavy or bulky.

The friction of the packages against the main belt added to that of moving against a fixed sweep arm as a diverting device many times tips the packages and causes them to fall off the conveyor and almost always stops their movement so that the oncoming packages crowd against them and cause jams of more or less frequency entailing the attention of an operator or perhaps several operators along the line to keep the packages straightened out and moving in proper manner.

The subject of this application comprises a device that is a complete portable unit, that is easily moved along the main conveyor belt and is quickly attachable at any place along its entire length, and which has movable means for receiving the articles or packages as they approach and convey them at the same speed as when on the main belt or to accelerate the speed so they will clear the device well ahead of the oncoming packages and thus reduce the possibility of interference between packages to a minimum.

The device carries means for quickly attaching the end of a roller gravity conveyor so that the packages being diverted will be delivered to the gravity conveyor that is elevated above the plane of the main conveyor, which is highly desirable in order to give the gravity conveyor as long a travel as possible.

This portable unit also is provided with means whereby the movement of the main conveyor acts as the power medium to operate the diverting device, thus power is available wherever the diverter is attached to the main conveyor, and as the gravity conveyors are made up of portable units they may be assembled with the diverting device wherever it is desired to place it along the line.

It is therefore an object of the invention to provide a diverter for a conveying system that is portable and attachable at any point along the line.

It is also an object of the invention to provide a package diverting device deriving power to operate it from contact with the main conveyor.

It is a further object of the invention to provide a package diverting device that carries means for quickly attaching the end of a gravity roll or other type of conveyor.

It is a further object of the invention to provide a package diverting device for use with a belt conveyor which will snap into place without the necessity of special attaching devices.

It is a further object of the invention to provide a package diverting device that will be adjustable to different heights to accommodate operative conditions. With such objects in view as well as other advantages which may be inherent in the invention, consisting in the parts and combinations hereafter set forth and claimed, it is understood that the several necessary parts and combinations constituting the same may be varied in their proportions, placement and general arrangement without departing from the scope and nature of the invention, and in order to make the invention more clearly understood there are shown somewhat diagrammatically, in the accompanying drawings means and mechanism for placing the invention in the preferred form without limiting the improvements to the particular construction shown.

Referring to the drawings Figure 1 is a plan of the invention as applied to an ordinary belt conveyor and discharging onto a roller gravity conveyor of the well known type.

Figure 2 is a side elevation of the device of Fig. 1.

The numeral 1 represents any ordinary type of belt conveyor mounted on a horizontal frame work 2 and having the supporting rollers 3 arranged at regular intervals.

The diverter forming the subject matter of this application comprises a frame work 4, tied together by the cross member 5 and the cross member 6. The side frame members 4 extend ahead of the member 5 and form attachable means 7 having slotted openings 8 to engage with the roller spindles 9 which tends to accurately position the device relative to the main conveyor belt 1.

The frame members 4 carry a series of rollers 10, 11, 12 and 13. A conveyor belt 14 is trained over the rollers 10, 11 and 12 to act as the conveying means for packages landing on the diverter, and the roller 10 is provided with take-up means to keep the belt 14 sufficiently tight for operation.

The roller 13 is in floating relation to the side members 4 and may be covered with some yielding material such as rubber which will frictionally engage with the main belt 1 and with the belt 14 where it passes around the roller 12 and thus form the drive medium between the main belt 1 and the belt 14, and as positioned in Fig. 2 will drive the diverter belt 14 in the same direction and at the same speed as the main belt 1.

The forward end of the diverter is elevated and held in operative position by means of the side supports 15 which are pivoted to the frame 4 and have holes to snap over the ends of the tie rods 16 holding the rollers 3. Thus positioned the diverter is held sufficiently rigid for any normal operation.

Across the receiving end of the diverter is a member 5 acting as a tie bar and also acting as a cover for the drive roller 13 and as a guide to direct the packages up onto the diverter belt 14 from the main belt 1.

Across the delivery end of the diverter is a tie bar 6 secured to the pendent members 17 and carrying the angle bar 18 with the studs 19 which serve as attaching means for the roller gravity conveyor as clearly shown in Fig. 2, wherein the gravity conveyor is simple hooked over the studs 19 and thereby held in operative relation with the diverter.

The manner of attaching the diverter to the main conveyor and the manner of attaching the gravity conveyor to the diverter enables the device to be removed and replaced at any new position along the line without the intervention of tools or appliances.

*Operation*

In attaching the diverter to a conveyor belt as is shown in the drawings the diverter is held in the hands by operators and the ends of the frame 4 lowered down under one of the roller tie rods 16 and hooked thereunder just inside of the side bars 2, then the free end is lowered and the supports 15 sprung outside of the side bars 2 and snapped over the ends of the tie rods 16, several holes in each of the supports 15 being provided to give a measure of vertical adjustability.

As the diverter is lowered to the position for normal operation the friction roller 13 is pressed down onto the main conveyor belt 1 and it is thereby deflected as shown in the dotted lines of Fig. 2. This gives the belt a considerable arcuate contact with the roller and serves as a very efficient drive device to drive the diverter belt 14.

When the diverter is positioned the end of the roller gravity conveyor is hooked over the studs 19 and everything is in readiness for operation. Either a right hand or left hand gravity turn may be attached so that packages may be diverted to either side of the main conveyor.

Inasmuch as the rollers 3 are regularly spaced along the entire length of the main conveyor 1 it is quite apparent that the diverter can be almost instantly attached to any tie rod 16 along the entire conveyor system and thus in the quickest possible time change the direction or path of packages being moved by the main conveyor.

Owing to the fact that the diverter actually receives the packages by a moving element and carries them to the roller or other type of conveyor attached to the discharge end of the diverter, there is practically no cause for jamming or confusion at the diverter and no package is ever left stranded as is the case where the crowding of the packages has been depended upon for transferring them to another path.

It is to be understood also that the extent of the elevation of the packages is not limited to that shown but that the diverter may be made as long and extensive as desired to suit any and all conditions or requirements of operation.

Having thus described the invention what is claimed as new and desired to be secured by Letters Patent is:

1. A diverting device for changing the direction of moving packages in a transfer system comprising a portable frame member, said transfer system including rollers mounted on spindles, and a flexible conveyor belt moving over said rollers, means associated with said diverting device for attachment to the spindles of said transfer system, means on said diverter for engaging frictionally with said conveyor belt and transmitting movement therefrom, a conveyor belt on said diverter receiving movement from said friction means and means for positioning said diverter to elevate packages moved thereby and means for attaching a transfer device to said diverter to receive packages therefrom.

2. A main conveyor for moving packages along a predetermined path comprising a frame work, a flexible conveyor and supporting rollers, a package diverter consisting of a portable unit conveyor attachable to any one of said supporting rollers and wholly supported by said main conveyor, friction means on said portable unit conveyor for contact with said main conveyor to derive movement therefrom, means carried by said unit conveyor for directing packages from said main conveyor to said unit conveyor to transfer them to a place of disposal.

3. A main conveyor for moving packages through a predetermined path comprising a frame work, a flexible conveyor and supporting rollers, a package diverter consisting of a portable unit conveyor disposed over the said main conveyor and easily attachable to any one of said supporting rollers in any desired position therealong, friction means carried by said portable unit conveyor for contact with said main conveyor to derive movement therefrom, means carried by said unit conveyor for causing a flexing of said main conveyor when said friction means is contacted therewith.

4. A package diverting device for changing the direction of moving packages in a transfer system comprising a portable frame member, said transfer system including a series of rollers mounted on spindles and a flexible conveyor belt moving over said rollers, said portable frame member having means for attachment to the spindle of a roller, a friction drive member associated with said diverter and adapted to engage and flex said package diverting device associated with said conveyor belt to divert packages therefrom, means for attaching said diverting device to one of said supporting rollers while positioning said device over the top side of said conveyor belt, a friction drive roller carried by said diverting device, and a diverter belt carried by said device after attachment to said roller acting to flex said conveyor belt and force the said friction roller there-against to thereby transmit motion to said diverter belt, with means for securing said diverter device in such position.

10. A conveyor and transfer system for packages and the like comprising a conveyor belt, a diverter work supporting frame positioned over said conveyor belt and attached to said supporting structure, said diverting device carrying a friction roller and a diverting conveyor belt, the bringing of said diverter device into operative position relative to said conveyor belt after attachment acting to flex said conveyor belt and force said friction roller thereto against said diverter belt and transmit motion thereto to move packages away from said conveyor belt.

11. A diverter device for changing the direction of moving packages in a transfer system comprising a portable device, said transfer system including a main conveyor, a series of rollers supporting the conveyor and a structure for supporting said portable diverter device to any roller along said conveyor, means carried by said diverter device for engaging frictionally with said conveyor belt, a diverter means carried by said portable device, the positioning of said diverter device in operative relation with said conveyor belt flexing said belt below its normal line of travel to cause frictional engagement therewith and with said diverter belt to transmit motion thereto.

12. A diverter device for changing the direction of moving packages in a transfer system comprising a portable device attachable at any desired location along said system, said transfer system including a flexible conveyor belt and a structure for supporting the belt, the diverting device comprising a friction drive roller and a structure for supporting said diverting belt and means for fixedly locating the same, means for supporting said diverting device in any desired position along said flexible conveyor belt with said friction drive roller in driving contact therewith to transmit movement to said diverter belt to receive packages from said conveyor belt and move them therefrom.

13. A portable package diverter for application to a main belt conveyor to receive and divert packages therefrom, said diverter including a supporting frame, an endless belt conveyor mounted in said frame and cooperable with said main belt conveyor to form a continuation thereof, drive means associated with said diverter for operative engagement with said main belt conveyor to drive the diverter belt, and means for removably mounting said diverter in superposed driving relation with said main belt conveyor whereby said diverter may readily be removed for repositioning or transfer to another conveyor.

PAUL VAN WYK.
IRVINE R. ACHESON.